US012597710B2

(12) United States Patent
Ikegami et al.

(10) Patent No.: US 12,597,710 B2
(45) Date of Patent: Apr. 7, 2026

(54) WAVEGUIDE SLOT ANTENNA

(71) Applicant: DENSO CORPORATION, Kariya-city (JP)

(72) Inventors: Tomihiro Ikegami, Kariya-city (JP); Kazushi Kawaguchi, Kariya-city (JP)

(73) Assignee: DENSO CORPORATION, Kariya-city (JP)

( * ) Notice: Subject to any disclaimer, the term of this patent is extended or adjusted under 35 U.S.C. 154(b) by 313 days.

(21) Appl. No.: 18/058,075

(22) Filed: Nov. 22, 2022

(65) Prior Publication Data

US 2023/0099058 A1 Mar. 30, 2023

Related U.S. Application Data

(63) Continuation of application No. PCT/JP2021/018643, filed on May 17, 2021.

(30) Foreign Application Priority Data

May 25, 2020 (JP) ................................ 2020-090692

(51) Int. Cl.
*H01Q 13/10* (2006.01)
*H01P 3/123* (2006.01)

(52) U.S. Cl.
CPC .................................. *H01Q 13/10* (2013.01)

(58) Field of Classification Search
CPC ........ H01Q 13/00; H01Q 13/10; H01Q 13/22; H01Q 21/24; H01Q 21/0043; H01Q 21/005; H01Q 21/008; H01P 3/123; H01P 11/002
See application file for complete search history.

(56) References Cited

U.S. PATENT DOCUMENTS 5,619,216 A * 4/1997 Park ....................... H01Q 21/24 343/770
5,714,962 A 2/1998 Josefsson
2006/0244670 A1* 11/2006 Chekroun ............ H01Q 19/195 343/770

(Continued)

FOREIGN PATENT DOCUMENTS

CN 102723541 B 6/2014
JP 59-208903 A 11/1984
JP 2-186703 A 7/1990

*Primary Examiner* — Thai Pham
(74) *Attorney, Agent, or Firm* — Maschoff Brennan

(57) ABSTRACT

A waveguide slot antenna includes a waveguide having a plurality of slots spaced apart by a predefined distance in a central-axis direction of the waveguide, as a radiating section. An uneven section provided on an outer wall surface around the radiating section has a periodic concave-convex pattern extending from the radiating section. The uneven section includes a plurality of protrusions spaced apart by a predefined distance in a dispersed manner in each of an axis direction parallel to the central-axis of the waveguide in which the plurality of slots are arranged and an axis direction orthogonal to the central-axis of the waveguide, and grooves between the protrusions. The plurality of protrusions and the grooves causes incident waves incident from forward in a direction of radiation of radio waves emitted from the radiating section to be reflected in a direction different from an incident direction of the incident waves.

3 Claims, 7 Drawing Sheets

(56) References Cited

U.S. PATENT DOCUMENTS

| | | | | |
|---|---|---|---|---|
| 2010/0238085 | A1* | 9/2010 | Fuh | H01Q 13/22 343/771 |
| 2015/0229027 | A1* | 8/2015 | Sonozaki | H01Q 21/005 343/771 |
| 2018/0269591 | A1* | 9/2018 | Kirino | H01Q 1/3233 |
| 2018/0301820 | A1* | 10/2018 | Bregman | H01P 3/123 |
| 2018/0366818 | A1 | 12/2018 | Kawaguchi et al. | |
| 2020/0028272 | A1* | 1/2020 | Green | H01Q 15/0053 |
| 2021/0249777 | A1* | 8/2021 | Alexanian | H01Q 1/3233 |
| 2022/0037796 | A1 | 2/2022 | Green et al. | |

* cited by examiner

WAVEGUIDE SLOT ANTENNA

CROSS-REFERENCE TO RELATED APPLICATION

This application is a continuation application of International Application No. PCT/JP2021/018643 filed May 17, 2021 which designated the U.S. and claims priority to Japanese Patent Application No. 2020-090692 filed on May 25, 2020, the contents of each of which are incorporated herein by reference.

BACKGROUND

Technical Field

The present disclosure relates to a waveguide slot antenna including waveguides on its side, with each waveguide having a plurality of slots at predefined intervals.

Related Art

A frequency selection surface unit is known that can suppress unwanted reflections of radio waves from an antenna device. This frequency selection surface unit is configured as a dielectric substrate provided with crisscross-ring-shaped slots thereon, where the crisscross-ring-shaped slots are formed of a copper screen layer with cross-shaped slots and cross-shaped copper bar layers disposed in the respective cross-shaped slots of the copper screen layer.

This frequency selection surface unit allows the antenna device to transmit and receive radio waves by adjusting dimensions of the respective crisscross-ring-shaped slots, thereby suppressing reflections of the radio waves from the antenna device.

A waveguide slot antenna including waveguides on its side, each of which has a plurality of slots at predefined intervals, is known as an antenna device used in radar devices and communication devices. In this waveguide slot antenna, each slot is surrounded by metal. Thus, in a configuration where an object, such as a radome, is provided forward in the radiation direction of radio waves, the transmitted radio wave is reflected by the object and then hits a metal portion around the slots to be reflected from the metal portion with low losses. Thus, in the waveguide slot antenna, multiple reflections may occur between the object, such as a radome, disposed forward in the radiation direction of radio waves and the metal portion of the antenna body.

In the waveguide slot antenna, in the event where multiple reflections of a radio wave occur, the reflected waves caused by the multiple reflections may interfere with the reflected wave from a target to be detected at the radar device or with radio waves transmitted by communication partners at the communication device. Thus, multiple reflections in the waveguide slot antenna may degrade the target detection performance of the radar device and the communication performance of the communication device.

The above known frequency selection surface unit is capable of suppressing reflections of radio waves. Therefore, arrangement of the above known frequency selection frequency selection surface unit forward of the waveguide slot antenna in the radiation direction may suppress the multiple reflections described above and suppress the performance degradation of the radar device and the communication device using this antenna.

DESCRIPTION OF SPECIFIC EMBODIMENTS

Figure 1:
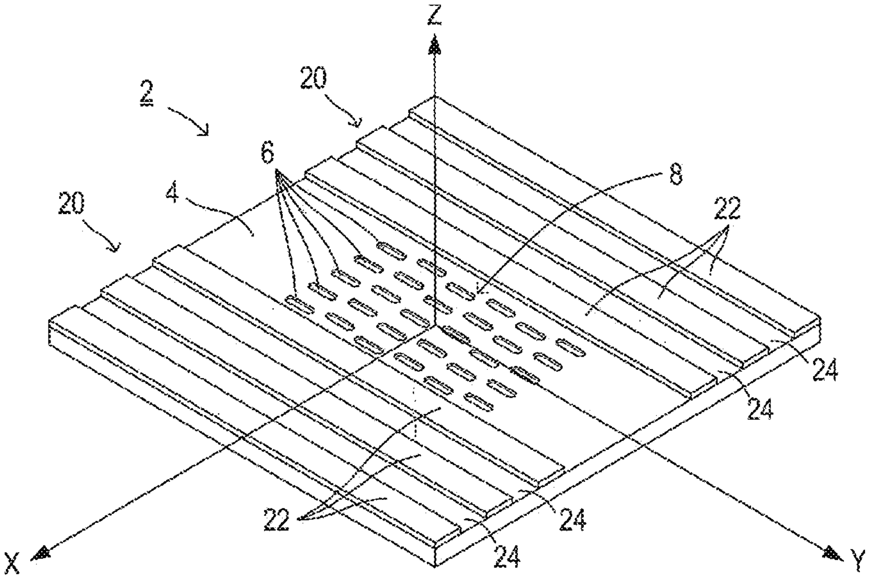
FIG. 1 is a perspective view of the overall configuration of an antenna device according to a first embodiment.

As a result of detailed research performed by the present inventors, the following issue has been found with the above known frequency selection surface unit as described in CN 102723541 B. That is, the frequency band of radio waves that can be transmitted and received is narrowed because the frequency of radio waves whose reflections allowed to be suppressed is limited by the crisscross-ring-shaped slots.

There is another issue as follows. That is, the frequency selection surface unit as disclosed in CN 102723541 B, as a so-called filter, is adapted to be disposed forward in the radiation direction of radio waves from the waveguide slot antenna. Thus, the transmitted and received radio waves may be attenuated, which may degrade the performance of the radar device and the performance of the communication device.

In view of the foregoing, it is desired to have a waveguide slot antenna capable of suppressing multiple reflections that occur between the antenna body and an object disposed forward in the radiation direction of radio waves without using a filter, such as the frequency selection surface unit or the like.

A waveguide slot antenna according to a first aspect of the present disclosure includes a waveguide having a plurality of slots spaced apart by a predefined distance in a central-axis direction of the waveguide. The plurality of slots provided in the waveguide serves as a radiating section that emits radio waves.

An uneven section is provided on an outer wall surface around the radiating section, and has a periodic concave-convex pattern extending from the radiating section. The uneven section is configured to reflect incident waves incident from forward in a direction of radiation of radio waves emitted from the radiating section, in a direction different from an incident direction of the incident waves.

Therefore, with the waveguide slot antenna of the present disclosure, when radio waves emitted from the radiating section hit an object located forward in the direction of radiation of the radio waves and are reflected therefrom, and then the reflected waves enter the antenna device, the uneven section can reflect the incident waves in a direction different from the direction of incidence.

This can suppress occurrence of multiple reflections described above, in which reflected waves from an object disposed forward in the direction of radiation are reflected from the outer wall surface surrounding the radiating section toward the same object.

Therefore, the waveguide slot antenna of the present disclosure can prevent unwanted noise components from being superimposed on radio waves that should be transmitted and received by the waveguide slot antenna due to multiple reflections and thus degrading the performance of a radar device or a communication device that uses the waveguide slot antenna.

The waveguide slot antenna of the present disclosure does not require a filter, such as the frequency selection surface unit described above, to be disposed forward in the direction of radiation of radio waves to suppress multiple reflections. This can therefore prevent the frequency band of radio waves that can be transmitted and received by the waveguide slot antenna from becoming narrower and transmission and reception power of such radio waves from being reduced by disposing a filter, such as the frequency selection surface unit.

A waveguide slot antenna according to a second aspect of the present disclosure includes a waveguide having a plurality of slots spaced apart by a predefined distance in a central-axis direction of the waveguide, as a radiating section that emits linearly polarized radio waves.

A plurality of rectilinear ridges are provided on an outer wall surface around the radiating section, where the plurality of rectilinear ridges are spaced apart and inclined at a predefined angle to the central axis of the waveguide.

The plurality of ridges are configured to reflect incident waves incident from forward in a direction of radiation of the radio waves from the radiating section to rotate a polarization plane of each incident wave by a predefined angle, in cooperation with a plurality of grooves between the ridges.

The waveguide slot antenna of the present disclosure can prevent linearly polarized radio waves emitted from the radiating section from being multireflected between an object disposed forward in the direction of radiation and the outer wall surface surrounding the radiating section, and the incident waves from being received by the radiating section.

Therefore, the waveguide slot antenna of the present disclosure can also prevent the performance of a radar device or a communication device that uses the waveguide slot antenna from degrading due to multiple reflections described above.

The waveguide slot antenna of the present disclosure also does not require a filter, such as the frequency selection surface unit described above, to be disposed forward in the direction of radiation of radio waves. This can therefore prevent the frequency band of radio waves that can be transmitted and received from becoming narrower and transmission and reception power of such radio waves from being reduced.

Embodiments of the present disclosure will now be described with reference to the accompanying drawings.

First Embodiment

The waveguide slot antenna of the present embodiment is used, for example, in a millimeter-wave radar device mounted to an automobile or the like, as an antenna device that transmits and receives millimeter waves in the 70-80 GHz band. In the following description, the waveguide slot antenna of the embodiment is simply referred to as antenna device 2.

An antenna device 2 of the present embodiment as illustrated in FIG. 1 includes a plurality of waveguides 10 disposed along an outer wall surface 4 orthogonal to the Z-axis that is the radiation direction of radio waves and in the X-axis direction of the outer wall surface 4.

Figure 2:
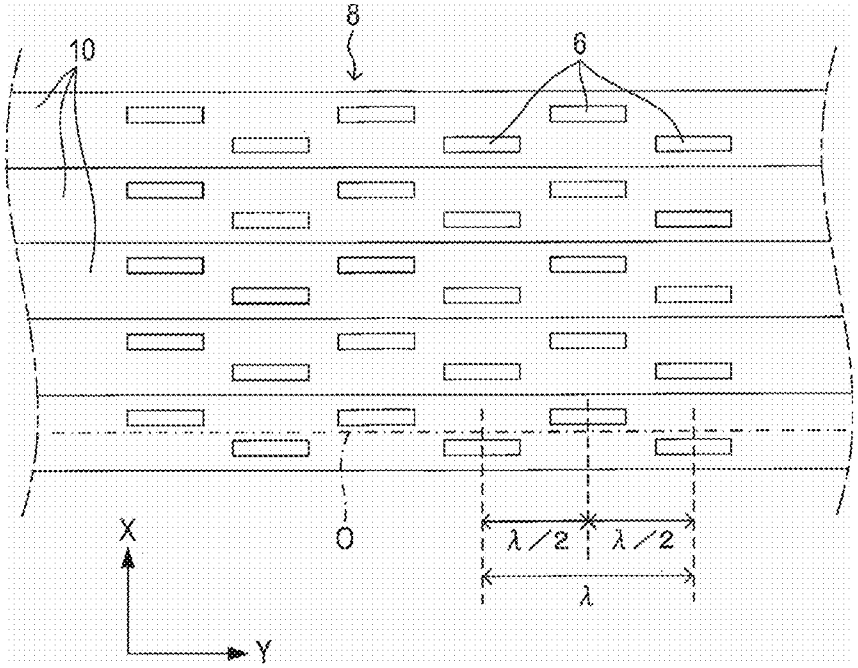
FIG.2 Prior Art
FIG. 2 is an illustration of arrangement of a plurality of waveguides constituting the antenna device.

The plurality of waveguides 10 are made of metal and are arranged, as illustrated in FIG. 2, such that the central axis O of each waveguide 10 is in the Y-axis direction orthogonal to the X-axis on the outer wall surface 4 of the antenna device 2 and the plurality of waveguides 10 are parallel to each other.

Each of the plurality of waveguides 10 has a plurality of slots 6 spaced apart by a predefined distance in the direction of the central axis O of the waveguide 10. Such parallel arrangement of the waveguides 10 causes the slots 6 to be spaced apart by a predefined distance in each of the X- and Y-axis directions on the outer wall surface 4 of the antenna device 2.

The plurality of slots 6 arranged in the x-axis and y-axis directions in such a distributed manner function as a radiating section 8 that emits radio waves in the Z-axis direction from the outer wall surface 4 of the antenna device 2.

In each waveguide 10, the plurality of slots 6 are each elongated in the direction of the central axis O of the waveguide 10, and are arranged in the direction of the central axis O of the waveguide 10 every one-half ($\lambda/2$) of the wavelength $\lambda$ at the center frequency of the radio waves transmitted and received by the antenna device 2.

In each waveguide 10, the plurality of slots 6 are arranged alternately across the central axis O of the waveguide 10 and eccentrically from the central axis O. This arrangement can prevent radio waves emitted from the respective slots 6 from being opposite in phase from each other and cancelling each other out.

In the antenna system 2, the plurality of waveguides 10 described above are surrounded by transmission lines and probes for high-frequency signals to input transmission signals to the waveguides 10 and extract received signals from the waveguides 10.

Since the configuration of the waveguides 10 in which the plurality of slots 6 are provided as described above and the method of feeding power to the waveguides 10 are known technologies as described in, for example, JP 2008-167246 A, and they will not be described in detail here.

The outer wall surface 4 of the antenna device 2 extends from the plurality of waveguides 10 in the X-axis direction to provide the transmission lines for high frequency signals and probes in the antenna device 2. The outer wall surface 4 around the waveguides 10 is made of the same metal as the waveguides 10.

As illustrated in FIG. 1, in the antenna device 2, the outer wall surface 4 around the radiating section 8 includes uneven sections 20 having a periodic concave-convex pattern, extending from both sides of the radiating section 8 in the X-axis direction.

When radio waves emitted from the radiating section 8 hit an object located forward in the direction of radio wave radiation and reflected therefrom, and then the reflected waves are incident on the antenna device 2, the uneven section 20 reflects the incident waves in a direction different from the direction of incidence.

That is, the antenna device 2 is installed on an automobile such that the X-axis direction along which the plurality of waveguides 10 are arranged is horizontal, and is thereby used in the radar device to detect targets, such as other vehicles and pedestrians, located forward in the travel direction of the automobile.

Figure 3:
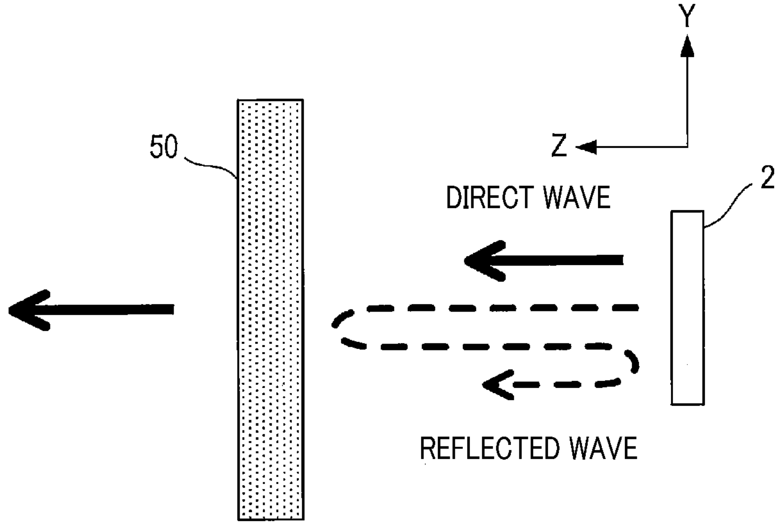
FIG. 3 is an illustration of multiple reflections occurring between the antenna device and an object.

As illustrated in FIG. 3, an object 50, such as a car bumper, a radome or the like, for protecting the antenna device 2 is disposed forward in the direction of radio wave radiation from the radiating section 8 of the antenna device 2. Therefore, the radio waves emitted from the radiating section 8 will be transmitted through the object 50 to the surroundings of the automobile, and a portion of the radio waves will be reflected by the object 50, and the reflected waves will be incident on the antenna device 2.

Since the outer wall surface 4 of the antenna system 2 is also made of the same metal as the waveguides 10, the incident waves incident on the antenna device 2 are reflected by the outer wall surface 4 of the antenna device 2 with low losses.

This results in multiple reflections, where a portion of the radio waves emitted from the antenna system 2 are repeatedly reflected between the object 50 and the outer wall surface 4. Such multiple reflections cause unwanted signal components due to multiple reflections to be superimposed on the receiving signal of the antenna device 2, which reduces the accuracy of detection of target by the radar device.

Thus, in the present embodiment, uneven sections 20 are provided on the outer wall surface 4 around the radiating section 8 to suppress such multiple reflections.

The uneven section 20 is formed of a plurality of rectilinear ridges 22 and a plurality of grooves 24 therebetween, where the ridges 22 and the grooves 24 are parallel to the central axis O of each waveguide 10 in which the plurality of slots 6 are arranged.

Figure 4:
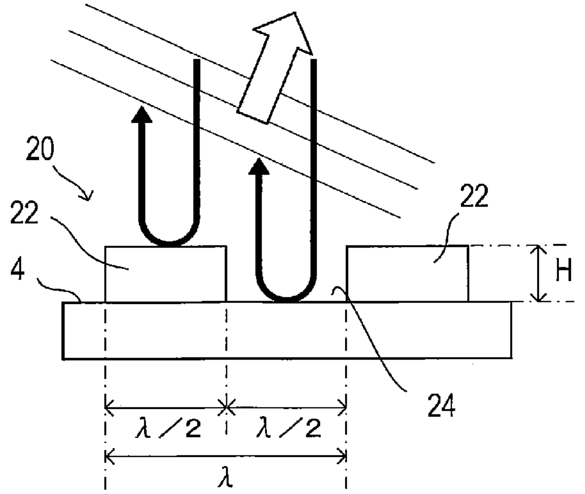
FIG. 4 is an illustration of a shape of an uneven section and reflection of radio waves resulting from the uneven section.

As illustrated in FIG. 4, in the uneven section 20 having a periodic pattern of the ridges 22 and the grooves 24 in the X-axis direction, the widths of the ridges 22 and the grooves 24 are each set to be one-half ($\lambda/2$) of the wavelength ($\lambda$) of the radio waves transmitted and received by the antenna device 2.

As a result, the reflected waves emitted from the radiating section 8 forward in the Z-axis direction and reflected from the object 50 disposed forward in the direction of radiation are reflected by the outer wall surface of the ridges 22 as convex portions and the grooves 24 as concave portions, respectively, where the reflected waves have a phase difference depending on the depth H of the grooves 24.

The phase difference will cause the reflected waves reflected from the outer wall surface 4 of the antenna device 2 to be reflected in a different direction from the direction of incidence from the object 50 disposed forward in the direction of radiation.

That is, the reflected waves from the object 50 disposed forward in the direction of radiation are incident on the outer wall surface 4 of the antenna device 2 from the Z-axis direction, and the incident waves are reflected from the outer wall surface 4 of the antenna device 2 at an angle different from the angle of incidence of the incident waves, as indicated by the white arrows in FIG. 4.

Therefore, power of the reflected waves reflected from the outer wall surface 4 of the antenna device 2 toward the object 50 forward in the direction of radiation is significantly lower than that of the antenna device without the uneven section 20, which allows for suppression of multiple reflections.

Figure 5A:
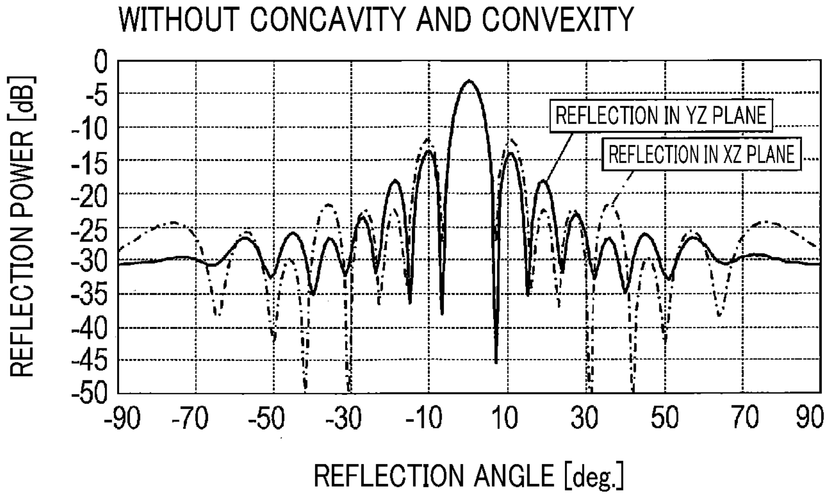
FIG. 5A is an illustration of radio wave reflection characteristics of the antenna device without uneven sections.
Figure 5B:
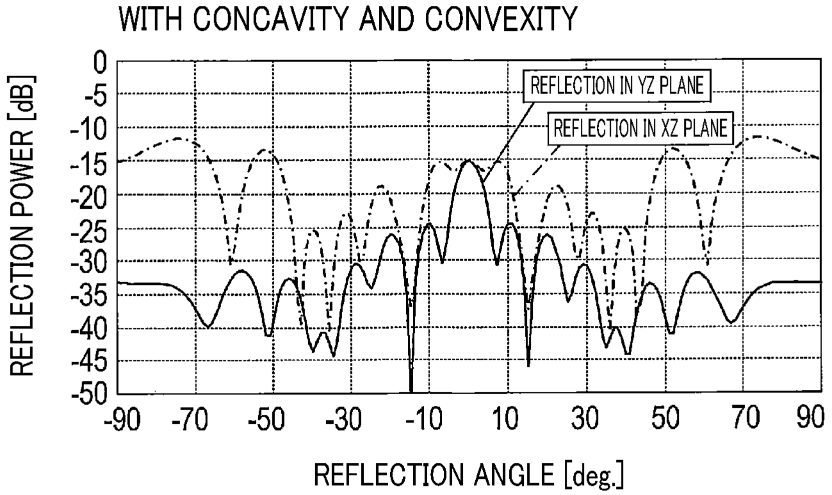
FIG. 5B is an illustration of radio wave reflection characteristics of the antenna device according to the first embodiment.

For example, FIG. 5A shows measurements of reflection power of radio waves in the antenna device with the outer wall surface 4 including no uneven sections 20, and FIG. 5B shows measurements of reflection power of radio waves in the antenna device 2 with the outer wall surface 4 including the uneven sections 20 according to the present embodiment.

These measurements represent the reflection power of radio waves when the reflection angle changes in the XZ and YZ planes, with the Z-axis direction as the reference angle 0 [deg.].

As illustrated in FIG. 5A, in the antenna device with the outer wall surface 4 including no uneven sections 20, the reflection power for the incident waves incident from the Z-axis direction is highest in the Z-axis direction at a reflection angle of 0 [deg] and decreases as the reflection angle changes in the X-axis and Y-axis directions.

In contrast, as illustrated in FIG. 5B, in the antenna device 2 of the present embodiment, as compared to the antenna device without the uneven sections 20, the reflection power decreases significantly in the reflection angle range of 0±40 [deg]. This is because the uneven sections 20 reflect the incident waves in the X-axis direction in a dispersed manner.

In this way, with the antenna device 2 of the present embodiment, when reflected waves from an object 50 disposed forward in the direction of radio wave radiation are incident on the antenna device 2, the incident waves can be reflected in a dispersed manner in directions different from that of the incident waves.

Therefore, even when radio waves emitted from the radiating section 8 of the antenna device 2 are reflected by an object 50 disposed forward in the direction of radiation and the reflected waves are incident on the antenna device 2, multiple reflections between the outer wall surface 4 of the antenna device 2 and the object 50 can be suppressed.

Therefore, the antenna device 2 of the present embodiment can reduce unnecessary reflected signal components received at the radiating section 8 caused by multiple reflections and thereby increase the detection accuracy of targets by the radar device.

In addition, the antenna device 2 of the present embodiment does not require a filter, such as the frequency selection surface unit, to suppress occurrence of multiple reflections, which can prevent the frequency band of the radio waves that can be transmitted and received from being narrowed, and the transmission and reception power of such radio waves from being reduced.

The direction of reflection of radio waves from the outer wall surface 4 of the antenna device 2 may be set by adjusting the depth H of the grooves 24 to adjust the phase of the reflected waves from the ridges 22 and the grooves 24. The direction of reflection of radio waves from the outer wall surface 4 of the antenna device 2 may also be set by adjusting the width of the ridges 22 to adjust the phase of the reflected waves from the ridges 22 and the grooves 24.

That is, increasing the width of the ridge 22 to above $\lambda/2$ will increase the reflection power from the ridges 22, and decreasing the width of the ridges 22 to below $\lambda/2$ will decrease the reflection power from the ridges 22. Therefore, adjusting the width of the ridges 22 allows the reflection power from the ridges 22 to be adjusted.

Adjusting the reflection power from ridges 22 allows the direction of reflected waves from the outer wall surface 4 of the antenna device 2 to be changed as combined with the reflected waves from the grooves 24.

Therefore, the width of the ridges 22 does not necessarily have to be set to λ/2, but may be set according to the reflection direction of the reflected waves from the outer wall surface 4 as appropriate.

Since it is sufficient that radio waves are incident in the grooves 24 and the incident waves are reflected by the outer wall surface in the grooves 24, the width of the grooves 24 may be greater than λ/2. That is, if the width of the groove 24 is less than λ/2, radio waves fail to be incident in the grooves 24 and thus fail to be reflected from the grooves 24. Therefore, the width of the grooves 24 greater than or equal to λ/2 allows the radio waves incident on the antenna device 2 to be reflected from the grooves 24.

Therefore, in the antenna device 2 of the present embodiment, adjusting the width of the ridges 22 and the width of the grooves 24 in the uneven sections 20, and the depth H of the grooves 24 as appropriate allows the direction of reflection of the radio waves from the outer wall surface 4 of the antenna device 2 to be arbitrarily set. Setting these respective parameters can also improve the detection accuracy of targets in the radar device.

The depth H of the grooves 24, or in other words, the height of the ridges 22, does not have to be the same for all of them. For example, the height of each ridge 22 may be set to a different height such that the further away from or the closer to the radiating section 8, the higher the height of the ridge 22.

In the present embodiment, the plurality of slots 6 provided in each waveguide 10 are elongated in shape, and each slot 6 is provided in the waveguide 10 such that its longitudinal direction coincides with the direction of the central axis O of the waveguide 10. Therefore, the antenna device 2 is adapted to transmit and receive linearly polarized radio waves.

However, the waveguide slot antenna of the present disclosure may be, for example, an antenna device may have cross-shaped slots 6 and may thereby be configured to transmit and receive circularly polarized radio waves. That is, even an antenna device that transmits and receives circularly polarized radio waves may achieve the same effects as described above by providing uneven sections 20 around the radiating section 8 as described above.

First Modification

In the above first embodiment, the uneven sections 20 are each formed of the plurality of rectilinear ridges 22 that are parallel to the central axis O of each waveguide 10 of the plurality of waveguides 10 (e.g., as illustrated and described with respect to FIG. 2) and spaced apart in the X-direction, and the plurality of grooves 24 between the ridges 22.

Figure 6:
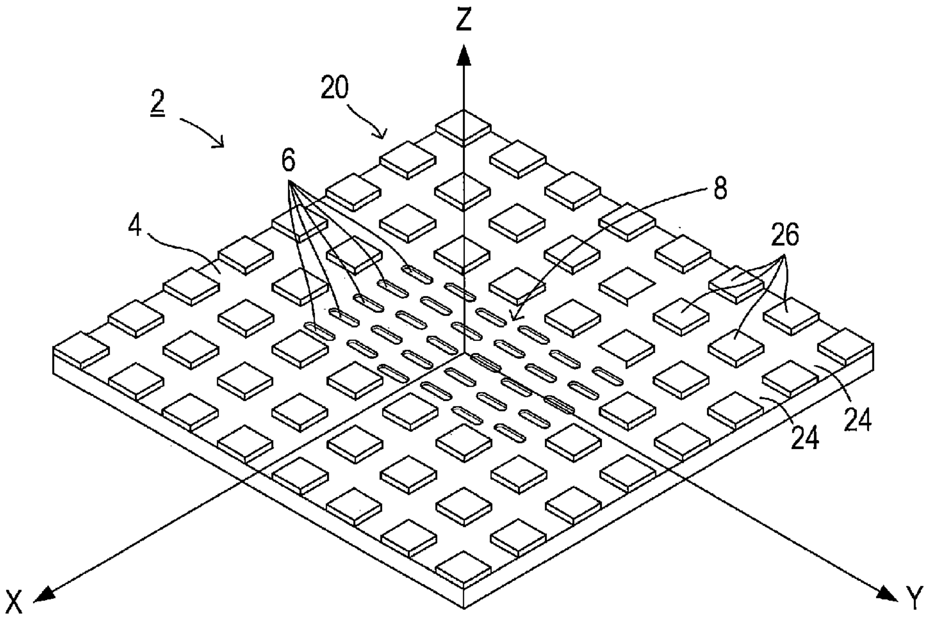
FIG. 6 is a perspective view of the overall configuration of an antenna device according to a first modification.

In the antenna device 2 according to a first modification, as illustrated in FIG. 6, the uneven section 20 is formed of a plurality of protrusions 26 spaced apart by a predefined distance in a dispersed manner in each of the X- and Y-axis directions to surround the radiating section 8, and a plurality of grooves 24 between the protrusions 26.

Even in such a configuration of the uneven section 20, setting the widths of the protrusions 26 and the grooves 24, and the depth of the grooves 24 as in the above embodiment, allows the direction of reflection of radio waves from the outer wall surface 4 around the radiating section 8 to be set in any direction different from the Z-axis direction.

Therefore, the antenna device 2 of the present modification, as in the first embodiment above, can suppress occurrence of multiple reflections between the outer wall surface 4 of the antenna device 2 and an object 50 disposed forward in the direction of radiation.

In the present modification, the protrusions 26 constituting the uneven section 20 have a square prismatic shape. Alternatively, the protrusions 26 may have a triangular or pentagonal or more prismatic shape, or they may have a circular or oval prismatic shape.

The shape of each protrusion 26 does not have to be identical. Alternatively, protrusions 26 having different shapes may be arranged in an appropriately dispersed manner. The height of each protrusion 26 from the groove 24 does not have to be the same. Alternatively, the height of each protrusion 26 from the groove 24 may be set to a different height, or may be set to a different height depending on the shape of the protrusion 26.

In the present modification, the protrusions 26 are spaced apart by a fixed distance in each of the X- and Y-axis directions. Alternatively, the protrusions 26 may be spaced apart by an arbitrary distance in each of the X- and Y-axis directions or may be arranged radially from the center of the radiating section 8.

Second Modification

Figure 7:
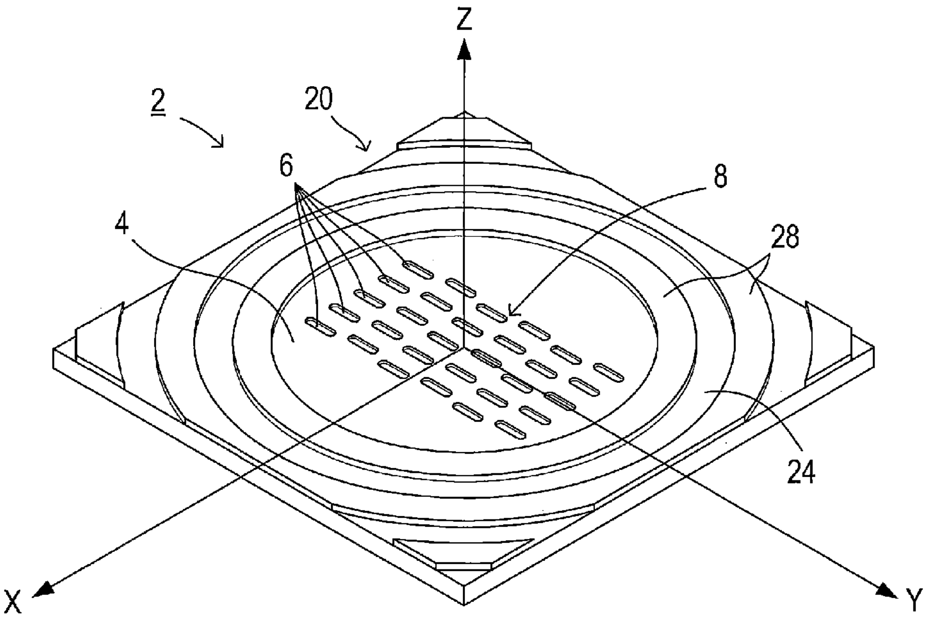
FIG. 7 is a perspective view of the overall configuration of an antenna device according to a second modification.

In the antenna device 2 according to a second modification, as illustrated in FIG. 7, the uneven section 20 is formed of a plurality of circular-ring-shaped ridges 28, surrounding the entire circumference of the radiating section 8 having a plurality of slots 6, and a plurality of circular-ring-shaped grooves 24 between the circular-ring-shaped ridges 28.

Even in such a configuration of the uneven section 20, setting the widths of the circular-ring-shaped ridges 28 and the circular-ring-shaped grooves 24, and the depth of the grooves 24 as in the above embodiment, allows the direction of reflection of radio waves from the outer wall surface 4 around the radiating section 8 to be set in any direction different from the Z-axis direction.

Therefore, the antenna device 2 of the present modification, as in the above first embodiment and the above first modification, can suppress occurrence of multiple reflections between the outer wall surface 4 of the antenna device 2 and an object 50 disposed forward in the direction of radiation.

In the present modification, the ridges 28 constituting the uneven section 20 have a circular-ring-like shape. Alternatively, the ridges 28 may have an arbitrary ring-like shape, such as an oval-ring-like shape or polygonal-ring-like (e.g., square-ring-like) shape, surrounding the radiating section 8.

Third Modifications

Figure 8:
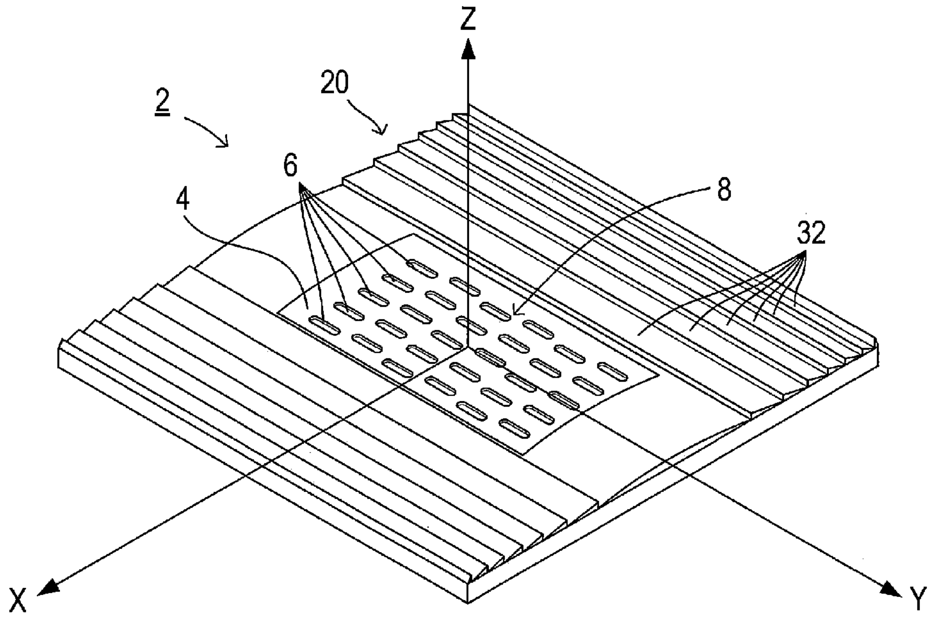
FIG. 8 is a perspective view of the overall configuration of an antenna device according to a third modification.

In the antenna device 2 according to a third modification, as illustrated in FIG. 8, the uneven section 20 provided on the outer wall surface 4 around the radiating section 8 is formed of a plurality of slopes 32, where each slope has the highest portion on the radiating section 8 side and the lowest portion on the opposite side.

Each of the plurality of slopes 32 is formed such that the height continuously varies from the highest portion to the lowest portion. Each slope 32 is linearly extending parallel to the central axis O of each waveguide 10. The respective slopes 32 are continuously connected in the X-axis direction.

That is, in the antenna device 2 of the present modification, the outer wall surface 4 around the radiating section 8 is a reflective surface changing in shape in a sawtooth manner, like a Fresnel lens. The width in the X-axis direction of each of the plurality of slopes 32 that constitute this reflective surface is set to be greater than or equal to λ/2 such that the closer the slope 32 is to the radiating section 8, the greater the width of the slope.

Even in such a configuration where the uneven section 20 includes a plurality of consecutive slopes 32, adjusting the widths of the respective slopes 32 and their height from the lowest to the highest portion allows the direction of reflection of radio waves from the outer wall surface 4 around the radiating section 8 to be set in any direction different from the Z-axis direction.

Therefore, the antenna device 2 of the present modification, as in the above first embodiment and the above first and second modifications, can also suppress occurrence of multiple reflections between the outer wall surface 4 of the antenna device 2 and an object 50 disposed forward in the direction of radiation.

Fourth Modification

Figure 9:
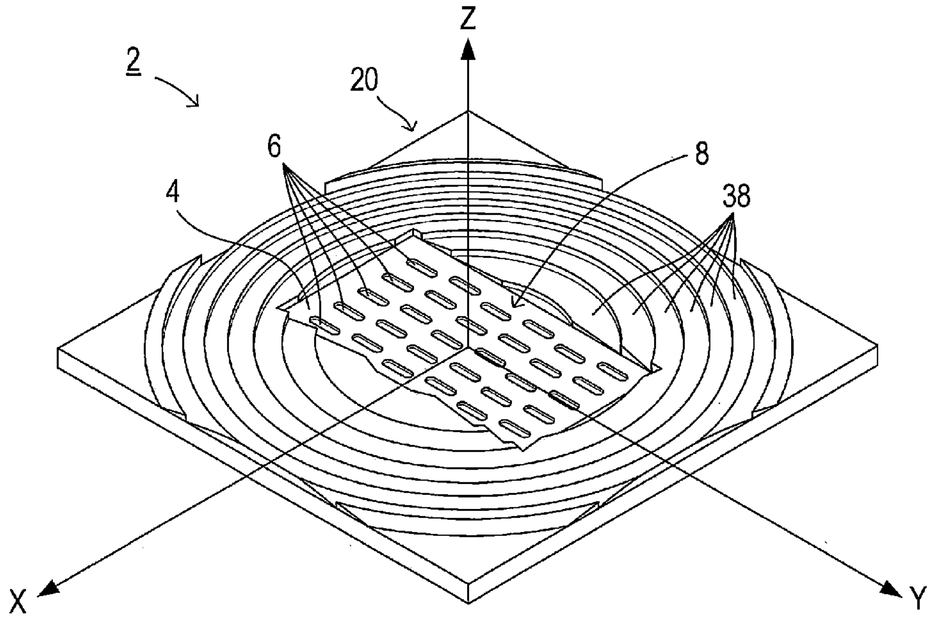
FIG. 9 is a perspective view of the overall configuration of an antenna device according to a fourth modification.

As illustrated in FIG. 9, in the antenna device 2 according to a fourth modification, an uneven section 20, as in the third modification, consists of a plurality of slopes 38. The plurality of slopes 38 are shaped like a circular ring surrounding the entire circumference of the radiating section 8, with each slope 38 centered on the radiating section 8 and extending continuously around the circumference.

Even in such a configuration where the uneven section 20 consists of a plurality of circular-ring-shaped slopes 32, adjusting the widths of the respective slopes 32 and their height, as in the antenna device 2 of the third modification, allows the direction of reflection of radio waves from the outer wall surface 4 around the radiating section 8 to be set in any direction different from the Z-axis direction.

Therefore, the antenna device 2 of the present modification, as in the above first embodiment and the above first, second, and third modifications, can also suppress occurrence of multiple reflections between the outer wall surface 4 of the antenna device 2 and an object 50 disposed forward in the direction of radiation.

In the present modification, the plurality of slopes 38 constituting the uneven section 20 does not need to have a circular-ring-like shape. Alternatively, like the ridges 28 of the second modification, the slopes 38 may have an arbitrary ring-like shape, such as an oval-ring-like shape or polygonal-ring-like (e.g., square-ring-like) shape.

Second Embodiment

Figure 10:
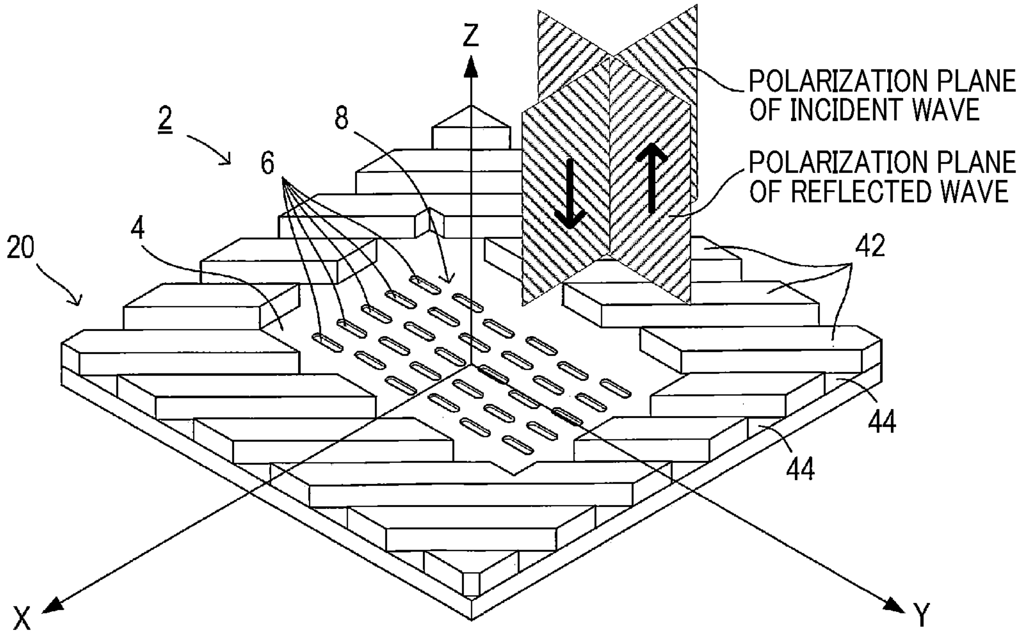
FIG. 10 is a perspective view of the overall configuration of an antenna device according to a second embodiment.

As illustrated in FIG. 10, the waveguide slot antenna of the present embodiment is, as in the first embodiment, an antenna device 2 utilized in a millimeter-wave radar device mounted to an automobile or the like, and includes a plurality of waveguides 10 as illustrated in FIG. 2.

The outer wall surface 4 around the radiating section 8 having the slots 6 provided in the plurality of waveguides 10 includes a plurality of rectilinear ridges 42 spaced apart by a predefined distance and inclined at an angle of 45 degrees to the Y-axis along the central axis O of each waveguide 10.

That is, in the present embodiment, the uneven section 20 is formed of a plurality of ridges 42 inclined at an angle of 45 degrees to both the Y-axis and the X-axis, and grooves 44 between the ridges 42.

In this uneven section 20, the width of each ridge 42 and the width of each groove 44 in the alignment direction are both set to one-half (λ/2) of the wavelength (λ) at the center frequency of radio waves transmitted and received by the antenna device 2. The depth of the grooves 44 is set to be $3 \cdot \lambda/2 + n \cdot \lambda$ (where n is an integer).

In the antenna device 2 of the present embodiment, the linearly polarized radio wave emitted from the radiating section 8 hits an object 50 and is reflected. When the reflected wave is incident on the antenna device 2, the polarization plane of the incident wave is rotated by 90 degrees at the uneven section 20 and is reflected.

Figure 11:
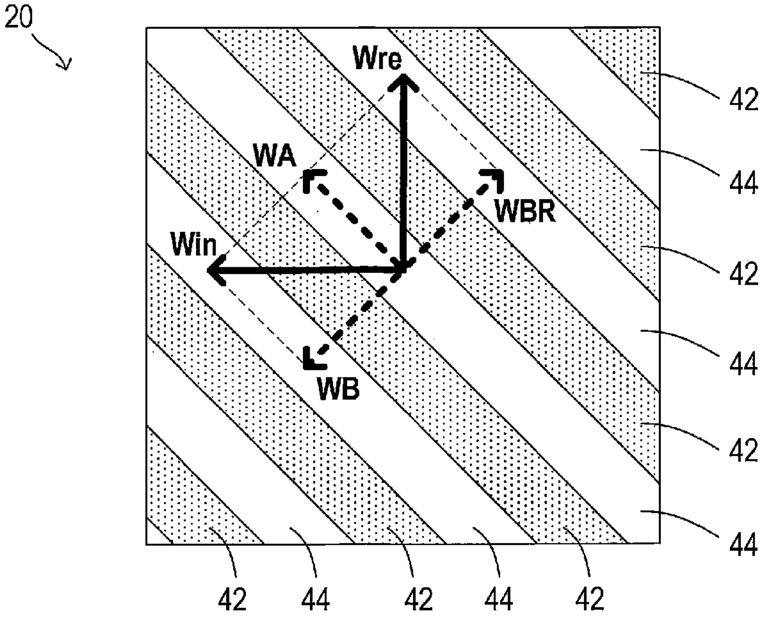
FIG. 11 is an illustration of the reflection characteristics of radio waves resulting from ridges and grooves according to the second embodiment.

That is, as illustrated in FIG. 11, when the electric field Win of the incident wave is divided into an electric field component WA parallel to the central axis of the groove 44 and an electric field component WB orthogonal to the electric field component WA, the electric field component WA is reflected in the groove 44 with the same phase regardless of the depth of the groove 44.

By contrast, due to the width of the groove 44 being λ/2, the electric field component WB is reflected in the groove 44, whereby phase rotation occurs together with reflection from the ridge 42. As a result, setting the depth of the groove 44 as described above causes the electric field component WB to be reflected with the opposite phase, and the reflected component of the WBR is combined with the reflection of the electric field component WA.

Therefore, as illustrated in FIG. 10, the linearly polarized radio wave emitted from the antenna device 2 hits the object 50 and is reflected from the object 50, causing the incident wave incident on the antenna device 2 to be reflected by the uneven section 20 provided on the outer wall surface 4, with the polarization plane rotated by 90 degrees.

Figure 12A:
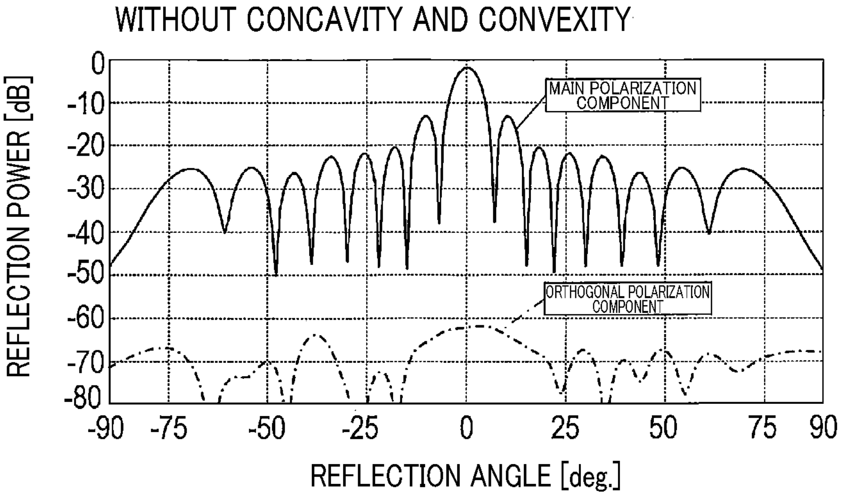
FIG. 12A is an illustration of radio wave reflection characteristics of the antenna device without uneven sections.
Figure 12B:
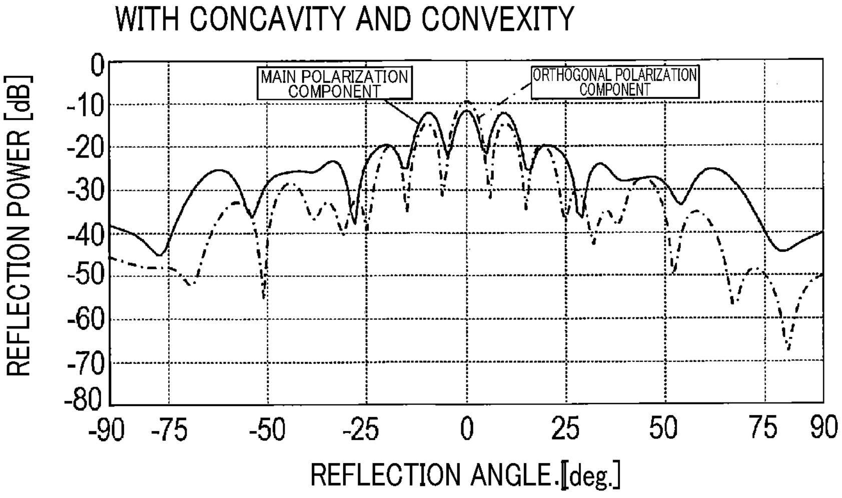
FIG. 12B is an illustration of radio wave reflection characteristics of the antenna device according to the second embodiment.

For example, FIG. 12A and FIG. 12B show results of measuring power of reflected waves of incident radio waves having the same polarization plane as that of linearly polarized radio waves emitted from the radiating section 8 for the antenna device with the outer wall surface 4 including no uneven section 20 and the antenna device 2 of the present embodiment, respectively.

As illustrated in FIG. 12A for the antenna device with the outer wall surface 4 including no uneven section 20, reflection power of the main polarization component of the reflected wave, having the same polarization plane as the incident wave, is significantly higher than reflection power of the orthogonal polarization component whose polarization plane is rotated by 90 degrees relative to the main polarization component.

By contrast, as illustrated in FIG. 12B for the antenna device 2 of the present embodiment, as compared to the antenna device with the outer wall surface 4 including no uneven section 20, reflection power of the main polarization component decreases significantly near the reflection angle of 0 [deg.], and reflection power of the orthogonal polarization component increases to the same level as the reflection power of the main polarization component.

Therefore, as can also be seen from the measurement results, the incident wave incident on the antenna device 2 is reflected by the uneven section 20 provided on the outer wall surface 4, with the polarization plane rotated by 90 degrees.

That is, in the antenna device 2 of the present embodiment, even if the reflected wave from the outer wall surface 4 of the antenna device 2 hits an object 50 and is thereby reflected, a radio wave whose polarization plane is rotated by 90 degrees relative to the radio wave that can be received will be incident on the antenna device 2.

Therefore, the antenna device 2 of the present embodiment can prevent reflected waves caused by multiple reflections between the outer wall surface 4 of the antenna device 2 and an object 50 disposed forward in the direction of radiation, from being received at the antenna device 2.

Therefore, even if multiple reflections occur between the object 50 forward in the direction of radiation and the antenna device 2, the radar device will be able to receive reflected waves from targets outside the vehicle to be detected without being affected by the multiple reflections, which can prevent the accuracy of detection of targets by the radar device from being degraded.

In addition, the antenna device 2 of the present embodiment also does not require a filter, such as the frequency selection surface unit, to suppress occurrence of multiple reflections, which can prevent the transmit/receive characteristics of the antenna device 2 from being degraded due to the presence of such a filter, as in the first embodiment.

In the present embodiment, the ridges 42 constituting the uneven section 20 are provided to be inclined at an angle of 45 degrees to the Y-axis along the central axis O of each waveguide 10. This is to reflect the incident wave with its polarization plane rotated by 90 degrees at the outer wall surface 4 of the antenna device 2.

Since rotating the polarization plane of the incident wave may reduce power of the reflected waves caused by multiple reflections, received at the radiating section 8, the inclination angle of the ridges 42 relative to the Y axis does not necessarily have to be 45 degrees, but may be changed as appropriate.

OTHER EMBODIMENTS

As above, while the specific embodiments of the present disclosure have been described above, the present disclosure is not limited to any of the above-described embodiments, and may be implemented with various modifications.

For example, as described in the above embodiments, the antenna device 2 as a waveguide slot antenna includes the plurality of waveguides 10, in each of which the plurality of slots 6 are arranged in a row along the central axis, and the plurality of waveguides 10 are arranged in parallel in the direction orthogonal to the central axis of each waveguide 10.

The technique of the present disclosure can be applied in the same manner as in the present embodiment or modification above, even to an antenna device with a single waveguide 10 in which a plurality of slots 6 are arranged in a row in the central-axis direction, which can achieve the same effects as described above.

As described in the above embodiments, the antenna device 2 as a waveguide slot antenna is used in the radar device for target detection mounted to an automobile or the like. The waveguide slot antenna of the present disclosure may also be applied to a communication device or the like that performs wireless communications.

Application of the antenna device of the present embodiment to a communication device may suppress multiple reflections of reflected waves from an object, such as a radome, disposed forward in the direction of radiation, between the antenna device and the object, which may degrade the communication accuracy of the communication device.

The shape and dimensions of the uneven section(s) 20 described in each of the above embodiments are examples, and may be changed as appropriate as long as reflection characteristics that can suppress the effects of multiple reflections can be achieved.

The antenna device 2 may be configured by combining the shapes of the uneven sections 20 of the above respective embodiments as appropriate and incorporating the combination in the outer wall surface 4.

What is claimed is:

1. A waveguide slot antenna comprising:

a waveguide having a plurality of slots spaced apart by a predefined distance in a central-axis direction of the waveguide, as a radiating section that emits radio waves; and an uneven section provided on an outer wall surface around and outside of the radiating section, the uneven section having a periodic concave-convex pattern extending from the radiating section, wherein:

the uneven section comprises:

a plurality of protrusions, as convex portions, wherein the plurality of protrusions are spaced apart by a predefined distance in a dispersed manner in each of a first axis direction parallel to the central-axis direction of the waveguide and a second axis direction orthogonal to the central-axis direction of the waveguide, and grooves, as concave portions, between the protrusions, the plurality of protrusions and the grooves cause incident waves incident from forward in a direction of radiation of radio waves emitted from the radiating section to reflect in a direction different from an incident direction of the incident waves, in the uneven section having the periodic concave-convex pattern provided on the outer wall surface of the waveguide, widths of the concave portions between the convex portions are each set as being greater than or equal to one-half of a wavelength ($\lambda/2$) of the radio waves emitted from the waveguide slot antenna, and a width of the grooves is greater than or equal to $\lambda/2$ such that the radio waves incident on the waveguide slot antenna are reflected from the grooves.

2. The waveguide slot antenna according to claim 1, wherein in the uneven section having the periodic concave-convex pattern provided on the outer wall surface of the waveguide, widths of the concave portions and the convex portions in an alignment direction of the periodic concave-convex pattern of the uneven section are each set as being $\lambda/2$.

3. The waveguide slot antenna according to claim 1, comprising a plurality of waveguides, wherein the plurality of waveguides are arranged in parallel in a direction orthogonal to a central axis of each waveguide of the radiating section, and the uneven section is arranged around the radiating section including the plurality of waveguides.

* * * * *